United States Patent Office 2,732,352
Patented Jan. 24, 1956

2,732,352

TERTIARY AMINO ANION EXCHANGE RESINS

Lloyd Eugene Van Blaricom and Kenneth Russell Gray, Shelton, Wash., assignors to Rayonier Incorporated, Shelton, Wash., a corporation of Delaware No Drawing. Application April 14, 1953,
Serial No. 348,802

7 Claims. (Cl. 260—2.1)

This invention relates to anion exchange resins of the amine type and has for its object the provision of an improved ion exchange resin in which the nitrogen-containing groups are exclusively tertiary amino groups, and a process of converting primary and secondary amino groups of amine-type ion exchange resins to tertiary amino groups in the production of improved anion exchange resins. The invention provides porous anion exchange resins of general utility and also anion exchange resins of extremely large porosity which have the particularly advantageous property of adsorbing and permitting ready elution of relatively large organic anions such as polymeric organic anions.

The resins of the invention have particular advantage for use with solutions containing organic compounds in repeated cycles of adsorption and elution.

This application is a continuation-in-part of our copending applications Serial No. 292,306 filed June 7, 1952, and Serial No. 223,182 filed April 27, 1951.

Anion exchange resins are potentially a very valuable tool for the commercial recovery and separation of acidic organic compounds from complex mixtures containing organic compounds, such as occur in extracts of natural products, fermentation broths as in the production of antibiotics, waste digestion effluents from pulping processes, etc. Anion exchange has proved valuable as a semi-quantitative analytical tool in the laboratory for effecting separation of organic compounds from complex mixtures. On a commercial basis, however, in contrast to wide spread use for removal of inorganic anions in water conditioning, anion exchange has not yet achieved large scale use for effecting separation and recovery of useful compounds from solutions of complex mixtures of organic compounds. The resins heretofore proposed tend to foul quickly with organic compounds or to form irreversible reaction products with reactive organic components in the mixtures so that their useful capacity is soon lost in repeated use and, in addition, often present difficulties in the elution of the desired compounds.

In general, anion exchange resins are porous cross-linked polymeric compounds containing ionizable groups which are capable of exchanging one anion for another. Physically they may be considered to be porous structures which are solid gels and chemically to be gels of an ionic nature. Those anion exchange resins in which the active exchange groups are amino groups or in which amino groups predominate are generally called amine-type anion exchange resins or anion exchange resins of the amine type to distinguish them from anion exchange resins in which the effective nitrogen-containing exchange groups are exclusively or predominately quaternary ammonium groups.

Amine-type anion exchange resins composed of or containing substantial amounts of primary and secondary amino groups while useful with inorganic compounds as in water conditioning are not suitable for use with solutions containing reducing groups, such as reducing sugars or other aldehydes or with solutions containing certain highly reactive compounds, such as lignosulfonates, phenols, etc. Such highly reactive organic compounds in the solutions being treated condense with the primary and secondary amino groups of the anion exchange resins and soon impair or destroy their effectiveness.

Other anion exchange resins, available in recent years, in which the exchange groups are quataernary ammonium groups do not to any significant degree have this disadvantage of forming irreversible reaction products with reactive compounds. Their exchange groups are, however, of a basicity of the order of sodium hydroxide so that elution of absorbed anions by means of sodium hydroxide is less efficient than with amine-type anion exchange resins, thus requiring greater amounts of sodium hydroxide. While this represents some disadvantage in the adsorption of small anions, for example, inorganic anions, the disadvantage is much magnified in the recovery by anion exchange of very large polymeric anions. Such large anions have a much greater tendency than smaller anions to resist elution, and, if they are adsorbed on a highly basic resin, elution with caustic soda is particularly inefficient resulting not only in excessive use of sodium hydroxide but also in many cases in contamination of the recovered product with the large excess of sodium hydroxide. Furthermore, in the recovery of compounds which form insoluble basic calcium salts, if calcium ion is present in solution and a highly basic resin containing quaternary ammonium groups is used, the highly basic condition in the immediate proximity of the resin will cause precipitation of insoluble basic calcium salts as an insoluble solid or gel in the pores of the anion exchange resin. This will quickly clog the resin and cause its capacity to soon fall to an uneconomical level. Such a condition involving clogging of the resin by basic calcium salts would particularly occur in attempting anion exchange recovery, for example, of lignosulfonates from calcium-base sulfite waste liquor by a highly porous resin containing quaternary ammonium groups.

A very low tendency toward fouling of a resin, either as regards reaction with organic compounds in the solution to be treated or as regards clogging with insoluble calcium compounds, is particularly important in the case of repeated cycle operation. In such operation the resin used is frequently considerably more costly than the acidic compound being recovered, or considerably more costly than the solution being treated to free it of unwanted anions. Economic practicability requires a resin which may be used repeatedly before the effective capacity of the resin becomes impaired.

Tertiary amino groups, as discussed in more detail later, do not give these difficulties. It is therefore desirable to provide anion exchange resins of the amine-type in which the active anion exchange groups are exclusively tertiary amino groups, as well as processes for converting primary and secondary amino groups of other amine-type exchange resins to tertiary amino groups.

Anion exchange resins of the amine-type which are suitable for conversion into the improved anion exchange resins of the invention may be prepared by the following general methods:

1. Resins prepared from aromatic amines and formaldehyde, for example, as in U. S. Patent No. 2,290,345.

2. Resins prepared by chlormethylating a polystyrene polymer cross-linked with divinyl benzene and then reacting the chlorine containing polymer with a polyethylene polyamine.

3. Resins prepared from aliphatic amines and cross-linking agents such as glycerol dichlorohydrin or epichlorohydrin, for example, as in U. S. Patent No. 2,469,694.

It might be theoretically possible to prepare directly an anion exchange resin containing only tertiary amino groups. In practice, however, it will generally be more feasible to prepare firstly an anion exchange resin in which at least a substantial portion of the nitrogen-containing groups will be primary or secondary amino groups or mixtures of these. Such primary and secondary amino groups may be rendered unreactive to reducing or other reactive organic groups by alkylating the resin by treatment with alkyl esters of strong acids (e. g., methyl chloride or dimethyl sulfate) in a manner similar to known procedures by which simple amines are alkylated. The resulting resin will be largely free from primary and secondary amino groups and the effective exchange groups will be a mixture of tertiary amino groups and quaternary ammonium groups, the latter generally in smaller amounts.

While resins so alkylated represent a definite improvement over resins containing primary and secondary amino groups, for some purposes they still have disadvantages when used in media containing organic compounds as a result of their quaternary ammonium groups which tend to cause inefficient elution and fouling of the resin.

In an embodiment of our invention we treat a porous anion exchange resin containing primary or secondary amino groups, or both, with an excess of a mixture of formic acid and formaldehyde. By this reaction, primary and secondary amino groups are methylated to form tertiary amino groups with essentially no formation of quaternary ammonium groups. Conveniently the resin in particle form may be heated with an excess of formic acid and formaldehyde in aqueous solution, termination of evolution of $CO_2$ serving as an indication of completion of reaction. In carrying out this reaction a resin should be used whose cross-linkages are stable to this treatment, e. g., one in which the cross-linking is not through methylene diamine bridges as in those of U. S. Patent No. 2,341,907. Such methylene diamine ($>N-CH_2-N<$) cross-links are broken by the treatment, possibly with methylation of the amino groups.

The resin so treated will have essentially no nitrogen-containing groups other than tertiary amino groups and there is no increase in basicity over that of the original resin containing undesirably reactive secondary and/or primary amino groups. Such a resin is very stable in the presence of reducing or other reactive organic groups and being weakly basic may be regenerated more efficiently than resins alkylated in such a manner as to contain in addition to tertiary amino groups an appreciable proportion of quaternary ammonium groups.

The amounts of chemicals needed are believed to be at least one mole of formic acid and one mole of formaldehyde for each mole of secondary amine groups present. A mole of primary amino groups will require at least two moles of both formic acid and formaldehyde. It is possible to determine nitrogen in the resin to be treated and assume the nitrogens are primary amino groups which would require the maximum amount of chemicals.

In practice a considerable excess of chemicals is generally used. If desired the unconsumed chemicals drained off at the completion of the reaction may be used to treat a succeeding batch of resin after adding chemicals to replace those consumed.

The resin may be tested for completion of methylation by treating the reacted resin (or a portion of it) with an additional amount of formic acid and formaldehyde. If there is essentially no evolution of $CO_2$ (as measured by bubbling through $Ba(OH)_2$ solution) the resin has been completely methylated. This test may be used in arriving at economical quantities of chemicals which will still give complete methylation.

In order to effect the reaction in a reasonable length of time heat is employed. While the temperature is not critical we find it convenient to use temperatures ranging from about 80° C. up to the boiling point of the solution.

The following example describes the preparation of an amine-type anion exchange resin from metaphenylene diamine in which the exchange groups are aromatic amino groups and methylation of this resin by the process of the invention.

EXAMPLE I 50 grams of metaphenylene diamine were dissolved in 300 grams of water containing 148 grams of concentrated HCl. The solution was placed in a resin flask and heated for one-half hour at 85° C. 100 grams of 37% formaldehyde were then added to the mixture as quickly as possible while stirring vigorously. After the mixture had gelled it was removed from the resin flask, broken up into small chunks and dried in the oven at 105° C. The resin was then ground up and 64.3 grams of dry resin that had been regenerated with 5% NaOH and washed was added to 69 grams of formic acid and 73 grams of formalin. The mixture was then heated on the steam bath at about 95° C. for 4 hours, removed and washed thoroughly with water.

The resin which was in the formate form was then regenerated with caustic soda. The resin was satisfactory for removing sulfur dioxide from a gaseous mixture of sulfur dioxide and air. The adsorbed sulfur dioxide could be substantially eluted by passing steam through the resin.

For adsorbing inorganic anions or small organic anions of comparable size from aqueous solutions, anion exchange resins with aliphatic amino groups (rather than aromatic amino groups) are generally preferred because they have higher effective capacities. Anion exchange resin with aliphatic amino groups may be especially advantageously methylated by the process of the invention. Any amine-type resin stable to formic acid, however, may be used giving at least in part the advantages of the invention. Examples of resins with aliphatic amino groups which may be readily treated by the process of the invention include:

1. Anion exchange resins containing secondary aliphatic amino groups prepared by chlormethylating a polystyrene polymer and then reacting this product with a polyethylene polyamine.

2. Anion exchange resins containing secondary aliphatic amino groups prepared by reacting polyethylene polyamine with cross-linking agents such as glycerol dichlorohydrin or epichlorhydrin, for example, as in U. S. Patent No. 2,469,694.

For an anion exchange resin to be effective in any exchange process in addition to having suitable anion exchange groups (in our novel resins only tertiary amino groups) it must be porous to the ions concerned in the adsorption. For an ion exchange resin with a given type of exchange groups, it is possible to have different degrees of porosity, generally according to the manner and degree to which the resin is cross-linked. Anion exchange resins which are effective for the adsorption and subsequent ready elution of large complex organic anions, such as polymeric anions, must have large pores and anion exchange groups which are exclusively tertiary amino groups.

For any type of ion exchange resin there will generally be an optimum amount of cross-linkage. With very low amounts of cross-linking the resins may be highly porous but the resins will generally be so weak or will swell so highly as to be unsuitable for practical use. Usually with extremely high degrees of cross-linking the resin particles while having good dimensional stability may have too low porosity to permit adsorption of ions. The optimum will therefore represent a compromise between these two conditions.

Because of poor dimensional stability, resins of suitably high porosity for the adsorption of lignosulfonate, for example, amine type resins prepared with as low degree of cross-linking as possible, prove to be completely inadequate for several reasons.

In the first place, while a cross-linked resin containing amino groups can be prepared in the wet state as a highly porous gel, amine-type resins in such form are more or less gelatinous so that on drying they shrink, losing the greater part of their porous structure. The dried resins thus have a relatively low capacity for large organic anions such as lignosulfonate anions. In addition, a resin of this type has poor mechanical properties in that when contacted with water it swells considerably and is partly gelatinized. It is therefore impractical to handle in conventional ion exchange equipment and thus from the standpoint of handling it is not of much practical use.

We have made the valuable discovery that resins of great dimensional stability and, as regards use in recovering very large anions such as lignosulfonate anions having both the required properties of high porosity and freedom from all nitrogen-containing groups except tertiary amino groups, can be made according to the process of our invention.

As one convenient process for the production of an anion exchange resin of the invention for use in recovering large organic anions we may start with any suitable highly porous dimensionally stable resin containing primary and secondary amino groups, such for example as the resin sold under the trade name Duolite A–2, as follows:

100 g. of Duolite A–2 resin was converted to the free base by treatment with sodium hydroxide and washed thoroughly and then drained. It was then mixed with 222 g. of 90% formic acid and 150 g. of commercial formalin solution, warmed slowly to approximately 90° C. on a steam bath with stirring and heated for a total of 6½ hours. Carbon dioxide was given off during the first part of this heating. The resin was then washed, regenerated to the basic form with sodium hydroxide and again washed. The resulting porous resin was very effective for the adsorption and elution of lignosulfonate.

In a more complete embodiment of our invention we may prepare the anion exchange in a three-step procedure, the important features of which follow:

*Step 1.—Preparation of highly porous phenolic resin.—* The general objective is to cross-link the resin as much as possible while it is in a highly swollen state and to cure it in the wet swollen form. The cured phenolic resin formed is relatively rigid even in the gel state so that it does not shrink when drying, and furthermore is quite stable on rewetting. In preparing this type of resin, phenol and formaldehyde are reacted in water solution containing sodium hydroxide. Sufficient sodium hydroxide is added not only to catalyze the solution, but to keep the resin in solution as long as possible. The resin is then cured in the presence of water and becomes highly cross-linked so that it can be dried with no appreciable shrinkage.

*Step 2.—Introduction of amino groups by reaction of phenolic resin with a polyethylene polyamine.—* To introduce amino groups the dried granulated phenolic resin is reacted by heating with a polyethylene polyamine directly or in a substantially anhydrous organic solvent. An example of a suitable solvent is toluene and the reaction will occur readily without the use of a catalyst.

The term "polyethylene polyamine" is used herein to include members, or mixtures of members, of the series which includes: ethylene diamine, diethylene triamine, triethylene tetramine, tetraethylene pentamine, and higher members of this series, as well as corresponding hydroxy ethyl derivatives, such as hydroxy ethyl ethylene diamine. Tetraethylene pentamine is particularly suitable in view of its high nitrogen content, substantial non-volatility and ready availability.

*Step. 3.—Methylation of highly porous amine-type resin.—* All primary and secondary amino groups in the porous amine-type resin formed as described in Step 2 are converted to tertiary groups without forming any quaternary ammonium groups by methylating with formic acid and formaldehyde, the resin being heated with an aqueous solution containing an excess of these chemicals.

It is possible to determine the absolute porosity of ion exchange resins by means of surface area measurements. Such measurements, however, are exceedingly complex and the procedure is not well adapted for use as a routine check of the suitability of the physical properties of a resin for adsorbing lignosulfonate or other large anions. We find it more practical and convenient to prepare resins with the exchange groups known to be effective (i. e. having exclusively tertiary amino groups) and to judge whether the resin is porous by determining whether it will adsorb anions such as lignosulfonate anions under conditions which are standard, simple and readily reproducible.

The following procedure may conveniently be used to determine in this manner whether a resin is sufficiently porous for the absorption of large lignosulfonate anions. (A similar test with appropriate modifications may be devised to test for porosity toward other anions.)

Approximately 200 ml. of stripped sulfite waste liquor is passed through a column of 17 mm. diameter which contains 100 ml. of wet, regenerated resin at a flow rate of approximately 3.5 ml. per minute. The column is then washed with water until the effluent is colorless and the effluent and washings are combined. The resin is regenerated by passing 100 ml. of 5% NaOH through the column at a flow rate of approximately 2 ml. per minute, followed by a water wash. The regeneration effluent and washings are then combined.

The estimation of the amount of lignosulfonic acid taken up by the resin can most simply be based on the fact that lignosulfonate ion has a very strong and characteristic absorption of light in the ultraviolet wave lengths. By determining on this basis the concentration of lignosulfonic acid in the original solution and that in the combined regeneration effluent and washings, the amount of lignosulfonic acid adsorbed on the resin is given by difference.

A convenient procedure for determining lignosulfonic acid in solution for such resin testing or for determining lignosulfonic acid in solutions at any stage is given below. This method is applicable to either the original sulfite waste liquor or to intermediate or final solutions of the ion exchange process containing the lignosulfonate ion.

Ultraviolet absorption measurements are made on lignosulfonate containing solutions wtih a spectrophotometer (conveniently a Beckman spectrophotometer using 1 cm. quartz cells and a hydrogen arc lamp as a light source). The solutions are diluted with distilled water to a known volume such that an optical density reading is obtained which is within the range of the instrument, and the optical density is determined at a wave length of 232.6 millimicrons. The concentration of lignosulfonic acid is then determined by use of the following expression:

$$c = \frac{\text{optical density}}{41.8}$$

where $c$ is the concentration of lignosulfonic acid in grams per liter. The concentration of lignosulfonic acid in the undiluted solution can then be calculated from this value.

The constant 41.8 given in the formula has been determined empirically using a highly purified sample of lignosulfonic acid from sulfite waste liquor from hemlock wood. In order to determine absolute yields of lignosulfonic acid from liquors from different sources, it may be necessary to redetermine this constant for each type of liquor used.

EXAMPLE II

The following example illustrates the preparation from simple materials of a resin in which the only nitrogen groups are tertiary amino groups which have sufficient porosity to effectively adsorb lignosulfonate.

*Preparation of resin.*—94.1 gm. phenol, 14.6 gm. acetone, 167 ml. formalin, and 2 gm. NaOH dissolved in 68 ml. of water were placed in a resin flask and heated on the steam bath for 2½ hours by which time it had set to a firm gel. It was heated for an additional ½ hour and then removed, broken up into small chunks and placed in an Alberger autoclave with 50 ml. of water. It was then heated for two hours at 110° C., removed, washed, and dried at 40° C. The dry resin was then ground to pass through a 20 mesh screen. It was then placed in the Alberger autoclave with an equal quantity of tetraethylene pentamine (as a 20% solution in toluene) and heated for one hour at 140° C. It was then removed, washed with methanol and then with water, and 120 ml. of the drained, wet resin was regenerated with 5% NaOH, washed thoroughly, and drained. It was then placed in a flask equipped with a stirrer and reflux condenser with 35 gm. formalin and 35 gm. formic acid and heated on the steam bath for 30 minutes with stirring. The resin swelled considerably and it was necessary to add an additional 35 gm. of formalin and 35 gm. formic acid. The mixture was then heated and stirred for an additional 5 hours, and was then removed and washed thoroughly with water.

*Test on resin.*—Capacity tests were run on the resin both before and after methylation with formic acid and formaldehyde. The test was carried out by regenerating the resin with 5% NaOH for one hour, washing thoroughly with water, and treating 100 ml. of the resin in a column with stripped bond liquor containing 10 gm. lignosulfonic acid, and regenerating with 150 ml. of 5% NaOH. The adsorption and regeneration effluents were analyzed for lignosulfonic acid (LSA) by use of the Beckman spectrophotometer. The results are as follows:

|  | Before Methylation | After Methylation [1] |
|---|---|---|
| LSA in Adsorption Effluent (per 100 ml. resin used)_____gm__ | 3.9 | 6.05 |
| LSA in Regeneration Effluent (per 100 ml. resin used)_____gm__ | 3.5 | 3.66 |
| Regeneratable Capacity of Resin, gm./LSA 100 ml. resin_____ | 3.5 | 4.89 |
| Efficiency of Regeneration, percent_____ | 57.5 | 93 |

[1] Tests run on 75 ml. resin.

An unexpected feature of our invention is that, while the anion exchange resin is only weakly basic, actual "salt splitting" of the lignosulfonate salt occurs. In order to demonstrate that a high basicity is neither required nor desired, the relative basicities of anion exchange resins may be determined by the following procedure.

Five grams of dry resin are regenerated by soaking in three changes of 5% sodium hydroxide solution, allowing one hour between changes. The resin is then thoroughly rinsed with distilled water until the rinse water is neutral, and covered with 50 ml. of a 1% solution of sodium chloride and stirred for one hour. A sample of the supernatant liquor is then removed and the alkalinity of the solution is determined by titration with a standard acid. The equivalents of sodium hydroxide formed may then be calculated, and this gives a measure of the basicity of the resin.

Table I below shows, in regard to an anion exchange resin porous enough to adsorb lignosulfonate, the effects of different degrees of alkylation as regards both relative basicities and the effects on the ability to elute lignosulfonate adsorbed from sulfite waste liquor.

*Table I*

| Resin No. | Characteristics of Resin | Resin Basicity Test (Milliequiv. of NaOH Liberated) | Lignosulfonate Adsorption Test | |
|---|---|---|---|---|
| | | | Resin Capacity (gm. LSA Adsorbed/ 100 ml. wet resin) | Percent of Adsorbed LSA Eluted |
| 1 | Aminated Phenolic Resin Having Substantially Primary and Secondary Amino Groups. | 0.073 | 5.5 | 44 |
| 2 | Resin No. 1 Alkylated By Process Other Than That of Invention to Give Mixture of Tertiary Amino Groups and Quaternary Ammonium Groups. | 0.35 | 5.2 | 84 |
| 3 | Resin No. 1 Methylated by Process of Invention to Give Only Tertiary Amino Groups. | 0.06 | 5.8 | 97 |
| 4 | Resin No. 3 Alkylated with Methyl Bromide to Give Substantial Content of Quaternary Ammonium Groups. | 1.1 | 5.3 | 63 |

From the table it will be observed that resin No. 3, which was produced by the novel process of the invention, is clearly superior to the other resins in that it is the only resin with which substantially complete elution of adsorbed lignosulfonate was obtained.

EXAMPLE III

The following example shows the valuable property acquired by an amine-type ion exchange resin on treatment by the process of the invention in regard to maintaining its capacity when subjected to repeated cycles of adsorbing lignosulfonate from sulfite waste liquor followed by elution with sodium hydroxide solutions.

300 ml. of wet Duolite A–2 resin which had been modified by the process of the invention was placed in a column and subjected to repeated cycles in automatic equipment. The repeated process was as follows:

2520 ml. of calcium-base sulfite waste liquor containing 90 gm./l. lignosulfonic acid was passed through the column at a flow rate of 150 ml./min., followed by washing the column with water for a period of one hour. 750 ml. of 5% NaOH was then passed through the column at a flow rate of 15 ml./min., followed by again washing with water for a period of one hour.

The above process was carried out for 64 cycles during which the resin showed an average capacity of 7.5 gm. lignosulfonic acid per 100 ml. of wet resin. This capacity for lignosulfonic acid was maintained during the course of the repeated cycling.

We claim:

1. A phenol - formaldehyde - alkylenepolyamine exchange resin in solid particulate form having dimensional stability and a porous structure capable of effectively adsorbing organic anions, and characterized by the fact that the nitrogen-containing groups are exclusively tertiary amino groups, in which methyl groups are substituted for hydrogen on the nitrogen of the resin.

2. A phenol-formaldehyde-polyethylenepolyamine exchange resin in solid particulate form having dimensional stability and a porous structure capable of effectively adsorbing organic anions, and characterized by the fact that the nitrogen-containing groups are exclusively tertiary amino groups, in which methyl groups are substituted for hydrogen on the nitrogen of the resin.

3. A phenol-formaldehyde-tetraethylene-pentamine exchange resin in solid particulate form having dimensional stability and a porous structure capable of effectively adsorbing organic anions, and characterized by the fact that the nitrogen-containing groups are exclusively tertiary amino groups, in which methyl groups are substituted for hydrogen on the nitrogen of the resin.

4. The process of preparing a porous anion exchange resin of the amine-type, capable of recovering polymeric anions, which comprises heating a solid particulate cross-linked gelled resin containing primary and secondary amino groups with an aqueous solution of formic acid and formaldehyde, each of which is present in sufficient amount to substitute methyl groups for all the hydrogens on the nitrogen of the resin with liberation of carbon dioxide, thus converting the primary and secondary amino groups exclusively to tertiary amino groups without formation of quaternary ammonium groups.

5. The process of preparing a porous phenol-formaldehyde-polyethylenepolyamine exchange resin capable of recovering polymeric anions, which comprises preparing a phenol-formaldehyde resin in the form of a gel, curing the resin in gel form by heating, subdividing the gel into small particles and drying it, reacting the dry particles with polyethylenepolyamine to form a resin containing groups including primary and secondary amino groups, and heating the resulting resin particles with an aqueous solution of formic acid and formaldehyde, each of which is present in sufficient quantity to substitute methyl groups for all the hydrogens on the nitrogens of the resin, thereby converting the primary and secondary amino groups exclusively to tertiary amino groups without formation of quaternary ammonium groups.

6. The process of claim 5, wherein the polyethylenepolyamine is tetraethylenepentamine.

7. The process of improving the properties of an amine-type anion exchange resin which has been prepared by the amination of a porous phenol-formaldehyde resin by reaction with a polyethylenepolyamine, said improvement comprising heating said amine-type anion exchange resin with an excess of formic acid and formaldehyde, with liberation of carbon dioxide and the conversion of the primary and secondary amino groups to exclusively tertiary amino groups without formation of quaternary ammonium groups.

References Cited in the file of this patent

UNITED STATES PATENTS

| | | |
|---|---|---|
| 2,290,345 | Melof | July 21, 1942 |
| 2,341,907 | Cheetham | Feb. 15, 1944 |
| 2,402,384 | Eastes | June 18, 1946 |
| 2,481,768 | Mills | Sept. 13, 1949 |
| 2,591,574 | McBurney | Apr. 1, 1952 |

OTHER REFERENCES

Walker: Formaldehyde, Reinhold, 1944, pages 266 and 267.

Clarke et al.: Jour. Amer. Chem. Soc., vol. 55, November 1953, pages 4571–4576.

Nachod: Ion Exchange, Academic Press, 1949, pages 62 and 63.